United States Patent [19]

Saiki et al.

[11] 4,031,547
[45] June 21, 1977

[54] NOISE REDUCING CIRCUIT FOR VIDEO SIGNALS

[75] Inventors: Yukimi Saiki; Masanori Ogino, both of Yokohama; Shutoku Watanabe, Ashiya, all of Japan

[73] Assignee: Hitachi, Ltd., Japan

[22] Filed: Nov. 18, 1975

[21] Appl. No.: 633,114

[30] Foreign Application Priority Data

Nov. 21, 1974  Japan .......................... 49-134960

[52] U.S. Cl. ............................. 358/167; 307/360; 325/480

[51] Int. Cl.[2] ...................... H04N 5/14; H03K 5/20

[58] Field of Search .......... 178/DIG. 12, 7.1, 7.3 R; 358/31, 167; 328/233 R, 165, 167; 330/30 R, 31; 307/235 N; 325/474, 427, 482, 480

[56] References Cited

UNITED STATES PATENTS

| | | |
|---|---|---|
| 3,333,055 | 7/1967 | Krause ....................... 178/DIG. 12 |
| 3,602,737 | 8/1971 | Radecke ..................... 178/DIG. 12 |
| 3,609,224 | 9/1971 | O'Toole ............................ 358/31 |
| 3,715,477 | 2/1973 | Olson ......................... 178/DIG. 12 |

Primary Examiner—John C. Martin
Attorney, Agent, or Firm—Craig & Antonelli

[57] ABSTRACT

A noise reducing circuit for video signals, in which a transistor has its base connected to a video detector and its collector to a direct current source through a coil, two diodes have their cathodes connected together and grounded through a first resistor with the anode of one of the diodes connected to one end of the coil and that of the other diode connected to the other end thereof, the collector of the transistor is further connected through a capacitor and a second resistor to the input terminal of a video output amplifier, which input terminal is grounded through a third resistor, and the emitter of the transistor is connected through another coil to the said terminal and grounded through another capacitor and a variable resistor.

7 Claims, 5 Drawing Figures

NOISE REDUCING CIRCUIT FOR VIDEO SIGNALS

BACKGROUND OF THE INVENTION

1. FIELD OF THE INVENTION

The present invention relates to noise reducing circuit for video signals for reducing a white noise which might be contained in the video signal.

2. DESCRIPTION OF THE PRIOR ART

The amplitude vs. frequency characteristic of a video signal processing circuit may be emphasized in a high frequency region to make an improvement in the sharpness of a reproduced image. This permits high frequency components of the video signal to be emphasized which are responsible for the contour of reproduced images, thereby improving the sharpness of the reproduced images. The emphasis of the high frequency components, however, causes the simultaneous emphasis of random noise components such as thermal noise contained in the video signal which results in deterioration of the quality of reproduced images. Usually, the emphasis of the high frequency components is limited to such an extent that the random noise components are not remarkable in reproduced images. The reduction of random noise components is, therefore, essential in order to effect a sufficient emphasis of the high frequency components.

Meanwhile, only a very small portion of the entire frame of a reproduced image is occupied by the contour portions of the reproduced image, in which changes of the brightness take place and therefore high frequency components are dominantly involved. Thus, the greater portion of the image is occupied by flat portions, in which no considerable change of the brightness takes place and therefore the low frequency components are dominantly involved. For this reason, an image with the reduced noise can be visually obtained by only reducing the random noise superimposed on the flat portions of the image. Therefore, the greater improvement in the sharpness of the reproduced image can be provided by reducing the random noise superimposed on the flat portion of the image, that is, by reducing the random noise superimposed on that portion of the video signal which doesn't contain high frequency components.

A noise reducing circuit for eliminating random noise superimposed on those portions of the video signal which are responsible for the flat portions of reproduced image is disclosed in Japanese Patent Publication No. 21269/67 published on Oct. 20, 1967. This published application has matured into Japanese Pat. No. 515842 entitled "System for Reducing White Noise in Television Signal or the Like" (Patentee: Japan Broadcasting Corporation). The noise reducing circuit according to this Japanese patent is expensive since it needs a great number of active elements and delay elements.

Since the level of noise contained in the video signal depends upon the intensity of an electric field of an input signal, it is preferable to make the degree of the noise reduction variable so as to lower the level of noise to be eliminated when the video signal has a high signal-to-noise ratio, thereby making smaller the higher frequency components of the video signal which must be eliminated together with the noise.

SUMMARY OF THE INVENTION

An object of the invention is to provide an improved and inexpensive noise reducing circuit for video signals.

Another object of the invention is to provide a noise reducing circuit for video signals in which the degree of the noise reduction is variable.

In order to achieve these objects, an active element with three electrodes are provided which has a first electrode to which a video signal is applied, a second electrode connected to a high-pass filter through which the high frequency components of the video signal are derived, and a third electrode connected to a low-pass filter through which the low frequency components of the video signal are derived. Further, a small amplitude component eliminator is connected to the high-pass filter for eliminating such components as having amplitudes smaller than a predetermined amplitude, the small amplitude component eliminator having no effect upon components having amplitudes not smaller than the predetermined amplitude. The low frequency components derived from the low-pass filter are added to the high frequency components from which the small amplitude components have been removed to generate a video signal free from noise appearing on the flat portions of reproduced image.

The present invention further includes means for varying the above-mentioned predetermined amplitude depending upon the intensity of an input field of a video signal.

DESCRIPTION OF THE PREFERRED EMBODIMENTS

Figure 1:
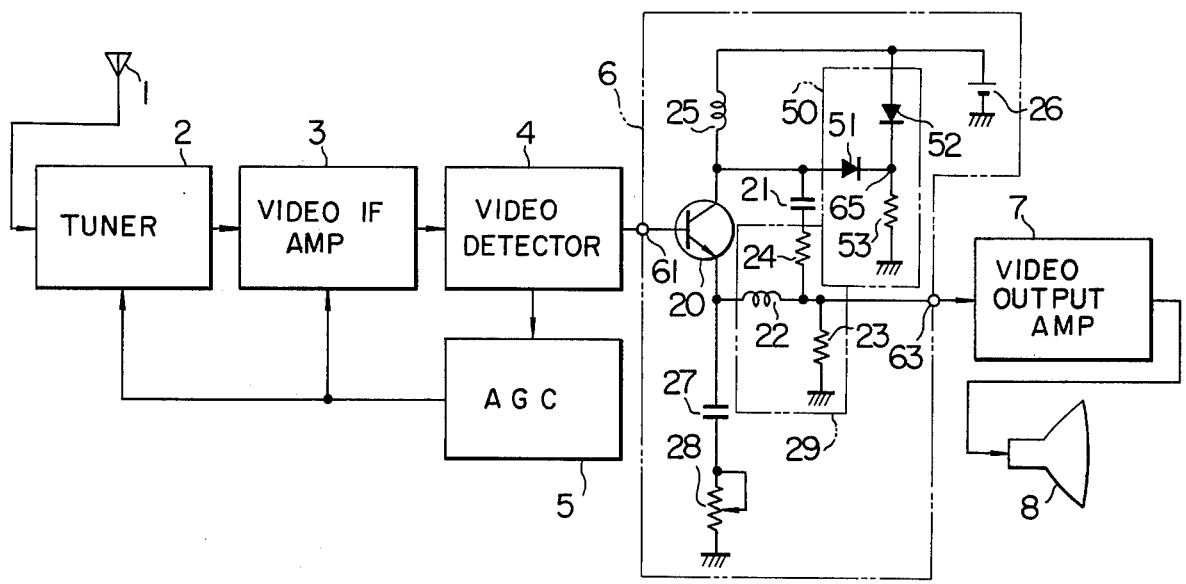
FIG. 1 is a circuit diagram showing one embodiment of a noise reducing circuit for video signals according to the present invention.

In FIG. 1, a television signal containing a video signal, received by an antenna 1, is converted by a tuner 2 to a video intermediate frequency signal, which is then amplified by a video intermediate frequency amplifier 3 and detected by a video detector 4. The video signals produced at the outputs of the video detector 4 including high and low frequency components and accompanied with noise are applied to an automatic gain control 5 and to an input terminal 61 of a noise reducing circuit for video signals according to the present invention. The automatic gain control circuit 5 generates an automatic gain control signal so that the intensity of the video signal obtained at the output of the video detector 4 may be kept constant thereby to control the gain of a high frequency amplifier in the tuner 2 or video intermediate frequency amplifier 3. The noise reducing circuit 6 reduces noise contained in the video signal. The video signal with reduced noise is derived from an output terminal 63 of the noise reducing circuit 6 and is applied to a video signal output amplifier 7 and further to a cathode-ray tube 8.

The present invention will be described in the following without any particular description of circuits other than the noise reducing circuit 6 because they are known in the television receiver art.

Figure 2:
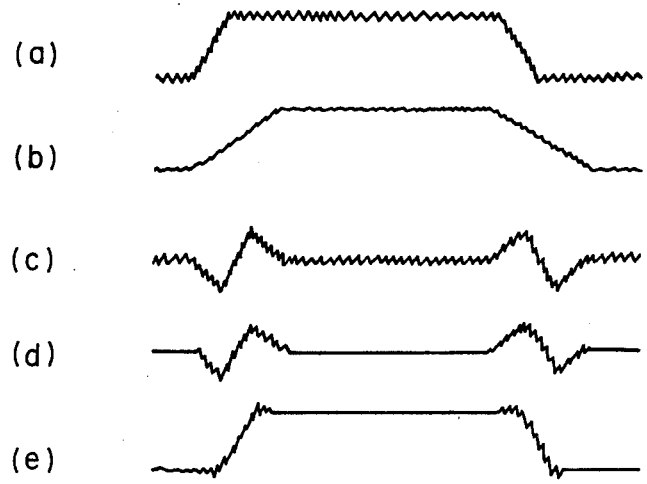
FIGS 2 and 3 are voltage waveforms on primary points of FIG. 1.

An active element having collector, source and control electrodes which may be, as shown, a transistor 20 operates as a grounded-collector amplifier for the low frequency components of the video signal and operates as a grounded-emitter amplifier for the high frequency component of the video signal. A capacitor 21 functions to cut a direct current component and has an impedance negligible for the video signal. A coil or an inductor 22 and resistors 23, 24 constitute a low-pass filter 29, through which low frequency components can be derived at the output terminal 63 from the video signal produced at the emitter of the transistor 20. If a video signal with some noise as shown in FIG. 2(a) is applied to the base of the transistor 20, a signal having a waveform shown in FIG. 2(b), that is, the low frequency components of the video signal are derived from the output terminal 63 of the low-pass filter 29. The resistor 24 has its one end connected to the terminal 63 and its other end AC-wise grounded through the capacitor 21 and a coil or inductor 25 serving as a low impedance element for the low frequency components of the video signal, so that a small amplitude component eliminator 50 comprising diodes 51, 52 and a resistor 53 has no influence on the characteristic of the low-pass filter 29. A DC voltage source 26 provides a bias to the diodes 51 and 52 and a collector bias to the transistor 20.

On the other hand, a circuit including the coils or inductors 22, 25 and resistor 24 constitute a high-pass filter which produces at the terminal 63 the high frequency components of the video signal appearing on the collector of the transistor 20. The small amplitude component eliminator 50 has an influence upon the high frequency components.

Assuming that the small amplitude component eliminator 50 is not provided, the high frequency components having a waveform shown in FIG. 2(c) will be produced at the terminal 63 through the high-pass filter. At the terminal 63, therefore, a signal similar to the original video shown in FIG. 2(a) is generated because the low frequency components shown in FIG. 2(b) are added to the high frequency components shown in FIG. 2(c) at the terminal 63.

A capacitor 27 serves to cut a direct current component and exhibits an impedance negligible for the high frequency components. For the high frequency components, therefore, the amplification degree of the amplifier including the transistor 20 is permitted to change by adjusting a variable resistor 28. For this reason, the contours of images reproduced by the high frequency components of the video signal can be either emphasized or blunted by adjusting the variable resistor 28.

Now, the operation of the small amplitude component eliminator will be described.

Figure 3:
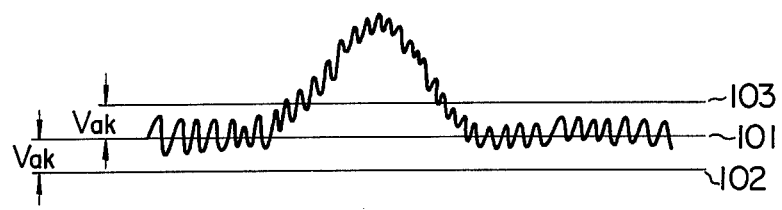

In FIG. 3 there is shown an enlarged waveform of the collector voltage of the transistor 20 during a fall time of the waveform shown in FIG. 2(a). The video signal applied to the base of the transistor 20 appears at its collector in an inverted form and is differentiated by the coil 25. Therefore, a voltage waveform shown in FIG. 3 appears at the collector of the transistor 20 during the fall time of the rectangular waveform with noise superimposed as shown in FIG. 2(a). It is to be noted that the waveform of the collector voltage is further differentiated to the waveform shown in FIG. 2(c) by the resistor 24 and coil 22.

In the waveform of FIG. 3 a level 101 shows a collector bias voltage of the transistor 20, or the supply voltage of the direct current voltage source 26, and a level 102 a voltage at the junction between the diodes 51, 52 and the resistors 53. The level 102 is lower than the level 101 by a voltage Vak between the anode and cathode of the diodes 51, 52 when they are turned on. A level 103 is, on the other hand, higher by the voltage Vak than the level 101.

The diode 51 is turned off when the collector voltage is lower than the level 102 while the diode 52 is turned off when the voltage at the connection 65 is higher than the level 101, that is, when the collector voltage becomes higher than the level 103. The diodes 51 and 52, therefore, remain in an on-state as long as the voltage lower than the level 102 or higher than the level 103 are not generated at the collector of the transistor 20. For this reason, no signal appears at the collector because of no change of the collector voltage. The small amplitude components between the levels 102 and 103, as would be generated at the collector in the absense of the small amplitude component eliminator 50, can be therefore eliminated by the eliminator 50. In other words, high frequency noise which is superimposed on those portions of the video signal which are responsible for the flat portion of reproduced images and has its level between the levels 102 and 103 when it appears at the collector of the transistor 20 can be eliminated by the small amplitude component eliminator 50. Since, on the other hand, the amplitude of the high frequency components of the video signal responsible for the contours of reproduced images are large, the level of the high frequency components appearing at the collector of the transistor 20 is lower than the level 102 or higher than the level 103, so that the high frequency component can be never eliminated by the small amplitude component eliminator 50.

FIG. 2(d) shows the high frequency components produced by eliminating noise superimposed on the flat portion from the high frequency component shown in FIG. 2(c) by means of the small amplitude component eliminator. A video signal with noise removed from the flat portion as shown in FIG. 2(e) can be generated by adding the high frequency components shown in FIG. 2(d) and the frequency components shown in FIG. 2(e).

The greater the voltage Vak between the anode and cathode generated when the diodes 51 and 52 are conductive, the greater the forward current becomes, so that the adjustment of the forward current flowing in the diodes 51, 52 permits the adjustment of the levels for noise which can be removed from the higher harmonic component. Simply, the modification of the resistor 53 to a variable resistor makes possible the manual adjustment of the forward current. Another approach is to vary the levels 102, 103 automatically depending on the intensity of the input field.

Figure 4:
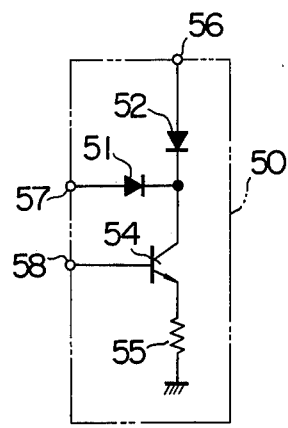
FIG. 4 is a circuit diagram showing a small amplitude component eliminator in which a maximum amplutide of components of a video signal to be eliminated is variable in response to an automatic gain control signal.

FIG. 4 is a circuit diagram showing such a small amplitude component eliminator. A terminal 56 is connected to a positive pole of the direct current source 26, a terminal 57 to the collector of the transistor 20 and a terminal 58 to the output terminal of the automatic gain control. A transistor 54 and a resistor 55 constitute a variable current source, and the forward current of the diodes 51, 52 increases with the increase in base voltage of the transistor 54. The output voltage of the automatic gain control circuit decreases at the input field of the television signal becomes stronger. This causes the decrease in gain of the high frequency amplifier in the tuner 2 or intermediate frequency amplifier 3 with the result of the lowering in noise level. Since the output voltage of the automatic gain control circuit 5 is applied to the base of the transistor 54, the forward current of the diodes 51, 52 decreases as the input field of the television signal becomes stronger. This causes the levels 102, 103 to approach to the level 101. For this reason, a range in which the smaller amplitude component is removed from the high frequency components decreases. This leads to the decrease in signal component removed together with the noise with the result of reproduction of images with high sharpness.

Figure 5:
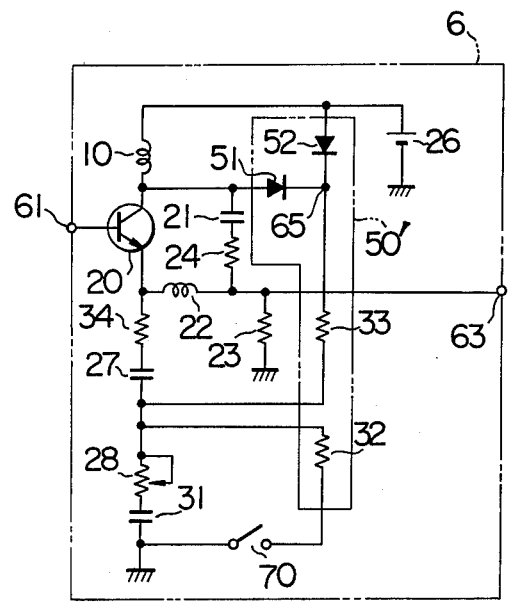
FIG. 5 is a circuit diagram showing another embodiment of a noise reducing circuit for video signals according to the present invention.

FIG. 5 shows another embodiment in which a switch 70 is provided for switching a small amplitude component eliminator 50' so that viewers can determine whethe it must be operated or not.

The switch 70 must be so arranged that the viewers can operate it. In a typical television receiver, therefore, it is necessary to mount the switch 70 on a printed circuit-board on which, for example, the variable resistor 28 is mounted, and which is provided separately from a printed circuit-board on which the video signal processing circuit such as the noise reducing circuit 6, video output amplifier 70, etc., except for the video detector 4 and the variable resistor 28 is mounted. For this reason, another wiring must be provided between the printed circuit-board on which the switch 70 is mounted and that on which the video signal processing circuit is mounted. This leads to a high cost only if the switch 70 is provided in the path of direct current flowing through the diodes 51, 52. In this embodiment, the variable resistor 28 is grounded through the capacitor 31 for the direct current element in order to dispense with the separate wiring. Further, a resistor 32 is connected through the switch 70 between both ends of a series circuit including the capacitor 31 and the variable resistor 28, and a resistor 33 is connected between the resistor 32 and the connection 65 so that the direct current can flow through the switch 70 and resistor 32. The switch 70, resistor 32 and capacitor 31 are mounted on the same printed circuit-board as that on which the variable resistor 28 is mounted. The direct current flowing through the diodes 51, 52 can, therefore, flow through lines through which the high frequency components of the video signal are also transmitted. Similarly to the variable resistor 28, a resistor 34 is an emitter resistor of the transistor 20 for the high frequency components of the transistor 20.

The small amplitude eliminator 50' doesn't operate when the switch 70 is turned off because no direct current flows through the diodes 51, 52. This therefore, permits only the adjustment of the high components contained in the video signal by means of the variable resistor 28.

On the other hand, the small amplitude component eliminator 50' operates when the switch 70 is turned on because the direct current flows through the diodes. If the resistance of the resistor 32 is much greater than the maximum resistance of the variable resistor 28, the adjustment of the high frequency components, that is, the adjustment of the sharpness can be provided while maintaining a state in which the random noise superimposed on the flat portion is reduced. The sharpness of the image is fixed at the time of operation of the small amplitude component eliminator 50' if the resistor 32 has zero resistance, that is, if no resistor 32 is provided.

We claim:

1. A noise reducing circuit for video signals comprising:
    an input circuit including an active element having first, second and third electrodes, said first electrode being for receiving a video signal including high and low frequency components accompanied with noise;
    a high-pass filter connected with said second electrode of said active element for deriving the high frequency components of said video signal and a low-pass filter connected with said third electrode of said active element for deriving the low frequency components of said video signal, said high-pass filter and low-pass filter serving as first and second loads on said active element with respect to said high and low frequency components of the received video signal on said first electrode of said active element respectively;
    a noise eleminating means including a voltage source and a switching circuit connected between said voltage source and said high-pass filter, the junction point between said switching circuit and said high-pass filter being connected with said second electrode of said active element, whereby said switching circuit is rendered conductive to make the potential on said second electrode substantially constant when the output of said high-pass filter, derivable on said second electrode of said active element, has an amplitude smaller than a predetermined value and is rendered non-conductive when said output derivable on said second electrode has an amplitude not smaller than said predetermined value; and
    means for adding the output of said low-pass filter to the output of said high-pass filter under control of said noise eliminating means, thereby reproducing a noise-suppressed video signal.

2. A noise reducing circuit for video signals according to claim 1, in which said high-pass filter includes an inductor, and said switching circuit includes two reverse-blocking diodes connected in series in opposite direction and a current source, said series-connected diodes being connected in parallel with said inductor, the junction point between said two diodes being connected to said current source.

3. A noise reducing circuit for video signals comprising a video signal source, an active element having first, second and third electrodes, means for connecting said video signal source to the first electrate of said active element, a high-pass filter connected to the second electrode of said active element for attenuating relatively low frequency components of the viode signal, a low-pass filter connected to the third electrode of said active element for attenuating relatively high frequency components of the video signal, a small amplitude component eliminator connected to said high-pass filter for eliminating such components as having amplitudes smaller than a predetermined amplitude from the relatively high frequency components of said video signal and having no effect upon such components as having not smaller than said predetermined amplitude, and adder means connected to said low-pass and high-pass filters for adding the relatively high frequency components of the video signal from which the small amplitude components have been removed to the video signal derived at the output of said low-pass filter, thereby generating a video signal with reduced noise, and wherein the video signal source includes a video signal generating means for receiving a television signal modulated by the video signal and detecting the video signal from the television signal for generation of the video signal and detector means for detecting an input field of the television signal to generate a detection signal which changes in dependence on the intensity of the input field, said connecting means conncting said video signal generating means and the first electrode of said active element and the detection signal from said detector means being applied to the small amplitude component eleminator, whereby the predetermined amplitude is varied depending on the intensity of the detected signal so that the predetermined amplitude becomes smaller as the input field of the television signal becomes greater.

4. A noise reducing circuit of video signals comprising:
an input circuit including an active element for receiving a video signal, said video signal including high and low frequency components and accompanied with noise;
a high-pass filter connected with said input circuit for deriving the high frequency components of said video signal;
a low-pass filter connected with said input circuit for deriving the low frequency components of said video signal;
means connected with said high-pass filter for eliminating noise contained in the high frequency components of said video signal;
means for adding the outputs of said noise eliminating means and said low-pass filter, and wherein said active element has a control electrode, a collector electrode and a source electrode, said high-pass filter including an inductor, said video signal being applied to the control electrode, the collector electrode being connected with a voltage source through said inductor in said high-pass filter, said noise eliminating means includes first and second reverse-blocking diodes having their cathodes connected with one end of an impedance means the other end of which is kept at a common potential lower than the supply voltage of said voltage source, the anode of said first diode is connected with the collector electrode while the anode of said second diode is connected with said voltage source whereby the voltage on the collector electrode is constant when said video signal applied to the control electrode of said triode has such an amplitude as to produce at the collector electrode of said triode a voltage between first and second level voltages, said first level voltage being the voltage at the junction of the cathodes of said first and second diodes and said impedance means when both of said first and second diodes are conductive, said second level voltage being the supply voltage of said voltage source plus the difference between the supply voltage of said voltage source and said first level voltage.

5. A noise reducing circuit according to claim 4, in which said impedance means includes a resistor.

6. A noise reducing circuit according to claim 4, in which said impedance means includes a transistor and a resistor, said transistor having its base adapted for receiving the output of an AGC circuit in a video circuit, its collector connected with the cathodes of said first and second diodes and its emitter connected with one end of said resistor the other end of which is kept at said common potential, so that said two level voltages are automatically adjusted depending upon the intensity of an input video HF signal.

7. A noise reducing circuit according to claim 4, in which said input circuit further includes a variable resistor having its one end connected with the source electrode of said triode for adjusting the gain of said triode with respect to the high frequency components of said video signal.

* * * * *